(12) United States Patent
Wilson et al.

(10) Patent No.: US 9,371,450 B2
(45) Date of Patent: Jun. 21, 2016

(54) FLAKE HAVING MULTILAYER COATINGS WITH OPTICAL AND THERMAL PROPERTIES

(71) Applicant: Building Materials Investment Corporation, Wilmington, DE (US)

(72) Inventors: Paul G. Wilson, Waxahachie, TX (US); Jacob S. Zhanel, Ennis, TX (US); Sudhir Railkar, Wayne, NJ (US); Daniel Boss, Parker, TX (US); Matti Kiik, Richardson, TX (US)

(73) Assignee: BUILDING MATERIALS INVESTMENT CORPORATION, Wilmington, DE (US)

( * ) Notice: Subject to any disclaimer, the term of this patent is extended or adjusted under 35 U.S.C. 154(b) by 0 days.

(21) Appl. No.: 14/151,898

(22) Filed: Jan. 10, 2014

(65) Prior Publication Data

US 2015/0197639 A1    Jul. 16, 2015

(51) Int. Cl.

| | |
|---|---|
| *C09C 1/62* | (2006.01) |
| *E04D 1/20* | (2006.01) |
| *E04D 7/00* | (2006.01) |
| *C09C 1/64* | (2006.01) |
| *B01J 2/00* | (2006.01) |
| *B01J 2/16* | (2006.01) |
| *E04D 1/00* | (2006.01) |

(52) U.S. Cl.
CPC .................. *C09C 1/642* (2013.01); *B01J 2/006* (2013.01); *B01J 2/16* (2013.01); *C09C 1/644* (2013.01); *E04D 1/20* (2013.01); *E04D 7/005* (2013.01); *C01P 2004/03* (2013.01); *C01P 2006/60* (2013.01); *E04D 2001/005* (2013.01); *Y10T 428/24388* (2015.01)

(58) Field of Classification Search
CPC ............ C09C 1/642; E04D 1/00; E04D 1/22; E04D 2001/005; B05D 5/06; B05D 2202/00; Y10T 428/24355; Y10T 428/24364; Y10T 428/24372; Y10T 428/2438; Y10T 428/24388; Y10T 428/24405; Y10T 428/24413; Y10T 428/24421; Y10T 428/2982; Y10T 428/2991; Y10T 428/2993; Y10T 428/2995; Y10T 428/2998
USPC ......................... 428/141–150, 402, 403–407
See application file for complete search history.

(56) References Cited

U.S. PATENT DOCUMENTS

| | | | |
|---|---|---|---|
| 2,981,636 | A | 4/1961 | Lodge et al. |
| 4,916,014 | A | 4/1990 | Weber et al. |
| 6,485,781 | B2 | 11/2002 | Allman et al. |
| 6,500,555 | B1 | 12/2002 | Khaldi |
| 6,596,070 | B1 | 7/2003 | Schmidt et al. |

(Continued)

FOREIGN PATENT DOCUMENTS

JP          10037404 A      2/1998

*Primary Examiner* — Nathan Van Sell
(74) *Attorney, Agent, or Firm* — Baker Botts L.L.P.

(57) ABSTRACT

A finished flake for a roofing material including a metal flake substrate having an emissivity value up to approximately 0.25 and a reflectivity value up to approximately 0.95. A first coating is provided having unpigmented sodium silicate disposed on the substrate, wherein the first coating increases the emissivity value of the substrate and decreases the reflectivity value of the substrate. A second coating is provided having sodium silicate loaded with reflective pigments non-uniformly disposed about the first coating, wherein the finished flake has an emissivity value in excess of approximately 0.75 and a reflectivity value ranging from approximately 0.4 to approximately 0.5.

21 Claims, 14 Drawing Sheets

(56) References Cited

U.S. PATENT DOCUMENTS

| | | |
|---|---|---|
| 7,452,598 B2 | 11/2008 | Shiao et al. |
| 7,455,899 B2 | 11/2008 | Gross et al. |
| 7,455,904 B2 | 11/2008 | O'Keefe |
| 8,197,893 B2 | 6/2012 | Leitch et al. |
| 2003/0091795 A1 | 5/2003 | Kiik et al. |
| 2004/0009319 A1 | 1/2004 | Zanchetta et al. |
| 2005/0051057 A1* | 3/2005 | Evans et al. ............. 106/287.34 |
| 2005/0129964 A1 | 6/2005 | Hugo |
| 2006/0156958 A1* | 7/2006 | Simmons et al. ............. 106/600 |
| 2007/0218251 A1 | 9/2007 | Jacobs et al. |
| 2008/0008858 A1 | 1/2008 | Hong et al. |
| 2008/0241472 A1* | 10/2008 | Shiao et al. .................... 428/144 |
| 2009/0191407 A1 | 7/2009 | Lewarchik et al. |
| 2011/0223385 A1* | 9/2011 | Shiao et al. .................... 428/144 |
| 2011/0311774 A1 | 12/2011 | Giri et al. |
| 2012/0107625 A1 | 5/2012 | Smith et al. |
| 2012/0270015 A1 | 10/2012 | Leitch et al. |
| 2013/0089707 A1* | 4/2013 | Faure ............................ 428/144 |

* cited by examiner

FLAKE HAVING MULTILAYER COATINGS WITH OPTICAL AND THERMAL PROPERTIES

BACKGROUND OF THE DISCLOSED SUBJECT MATTER

1. Field of the Disclosed Subject Matter

The disclosed subject matter relates to roofing material, and in particular to a roofing material, a finished flake for a roofing material, and a method of making a finished flake. The finished flake can be used for roofs and also for sidewalls and other exterior surfaces exposed to the weather. Particularly, the disclosed subject matter relates to metal flake surfaced roofing materials, such as disclosed in U.S. Publication No. 2003/0091795, entitled "Metal Flake-Surfaced Roofing Materials" filed on Oct. 21, 2002; U.S. Pat. No. 8,197,893, entitled "Colored Metal Flake Surfaced Roofing Materials"; and U.S. Publication No. 2012/0270015, entitled "Colored Metal Flake Surfaced Roofing Materials" filed on May 11, 2012, the contents of each of which are hereby incorporated by reference in their entireties.

The roofing materials which may be surfaced with finished flakes include, but are not limited to, asphaltic roofing materials and non-asphaltic roofing materials such as concrete, plastic, rubber or metal roofing materials that have other materials on the exposed surface to provide a weathering surface or which are used for aesthetic purposes. Some known roofing materials use granules made of rock which can allow ultraviolet light to penetrate and denigrate the roofing material.

The disclosed subject matter further relates to a finished flake and a method of making a finished flake for a roofing material such that the finished flake includes structural and functional benefits, along with pleasing aesthetics as noted herein. Flakes may be coated with one or more coating materials, and may be applied to the surface of roofing materials as the sole surfacing material or in combination with other materials, such as conventional colored roofing granules. Any roofing material that uses colored roofing granules, crushed natural stone, or coatings on the exposed roofing surface can have finished flakes applied thereto, in place of or in addition to the roofing granules, crushed natural stone, or coatings, in accordance with the disclosed subject matter.

2. Description of the Related Art

Roofing materials, such as roofing shingles, are made from a wide variety of materials, including metal, slate, concrete, plastic, asphalt, etc.

Metal roofs can be aesthetically pleasing, durable, long lasting, lightweight, ecologically sound, fire retardant, and energy efficient. Metal roofs can be expensive, can require installation by a professional trained in metal roofing installation, and can be damaged or dented by outdoor elements, such as hail.

Slate roofs can have long life, fire resistance, high strength, relatively low maintenance, and an aesthetically distinctive appearance. Slate roofs, however, can be heavy and expensive. Further, slate exists in limited color choices, can be easily damaged (particularly during maintenance due to walking on the roof), and relies on underlayment which usually fails before the slate.

Asphalt roofing materials can have good performance in extreme temperatures and areas where wind, water and ice are of concern. In addition, asphalt roofing materials can offer enhanced efficiency in that they can be produced in high volume and can be easily installed, resulting in lower costs and improved overall value. Furthermore, asphalt roofs can be made with colored granules to produce a colored roofing surface tailored to desired color, reflectance, and emittance. However, many asphalt roofing materials do not have the same aesthetic qualities as metal and slate roofs and can have diminished life span in comparison. Additionally, such roofing materials can be expensive.

Pigment-coated mineral rocks are commonly used as color granules in roofing applications to increase the aesthetic and protective functions of asphalt shingles. Roofing granules typically are made of crushed and screened mineral materials that, subsequent to crushing and screening, can be coated with a binder containing one or more coloring pigments such as suitable metal oxides. The binder can be a soluble alkaline silicate that is subsequently insolubilized by heat or by chemical reaction, resulting in an insoluble colored coating on the mineral particles. Preparation of colored, coated roofing granules has long been known in the art such as disclosed in U.S. Pat. No. 2,981,636 of Lodge et al., the contents of which is incorporated herein by reference in its entirety. The granules are then employed to provide a protective layer on asphaltic roofing materials, such as shingles.

Pigments for roofing granules have usually been selected to provide shingles having an attractive appearance, with little concern for the thermal stresses encountered on shingled roofs. However, depending on location and climate, shingled roofs can experience very challenging environmental conditions, which tend to reduce the effective service life of such roofs. One such environmental stress is the elevated temperature experienced by roofing shingles under sunny, summer conditions, especially roofing shingles coated with dark colored roofing granules.

Asphalt shingles coated with conventional roofing granules are known to have low solar heat reflectance, and hence will absorb solar heat especially through the near infrared range (700 nm-2500 nm) of the solar spectrum. This heat absorption characteristic is increased as the granules covering the surface become darker in color. For example, white colored asphalt shingles can have solar reflectance (sometimes referred to as "tsr" or total solar reflectivity) in the range of approximately 25 to approximately 35 percent, whereas dark colored asphalt shingles may have solar reflectance of only approximately 5 to approximately 15 percent.

Accordingly, there exists a need for a roofing material with improved durability and aesthetic qualities. Thus, there is a continuing need for roofing materials that exhibit excellent reflectance, as well as emittance, characteristics while being aesthetically pleasing. The presently disclosed subject matter satisfies these and other needs.

SUMMARY

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes finished flake for a roofing material, comprising, amongst other things, a metal flake substrate having an emissivity value of approximately 0.05 up to approximately 0.25 and a reflectivity value up to approximately 0.95; a first coating comprising unpigmented sodium silicate disposed on the metal flake substrate, wherein the first coating significantly increases the emissivity value of the substrate while decreasing the reflectivity value of the substrate a relatively small amount; and a second coating comprising sodium silicate loaded with reflective pigments non-uniformly disposed about the first coating of the metal flake substrate, wherein the finished flake has an emissivity value in excess of approximately 0.75 and a reflectivity value ranging from approximately 0.4 to approximately 0.5.

In accordance with another aspect of the disclosed subject matter, a method of making a finished flake for a roofing material is provided comprising, amongst other things, providing a metal flake substrate having an emissivity value of approximately 0.05 up to approximately 0.25 and a reflectivity value up to approximately 0.95; applying a first coating comprising unpigmented sodium silicate to the substrate, wherein the first coating significantly increases the emissivity value of the substrate while decreasing the reflectivity value of the metal flake substrate a relatively small amount; applying a second coating comprising sodium silicate loaded with reflective pigments non-uniformly about the first coating of the metal flake substrate; and curing the first coating and the second coating, wherein the finished flake has an emissivity value in excess of approximately 0.75 and a reflectivity value ranging from approximately 0.4 to approximately 0.5.

In accordance with another aspect of the disclosed subject matter, a roofing material is provided, comprising, amongst other things, a shingle material; and a plurality of finished flakes disposed about the shingle material, wherein each finished flake includes a metal flake substrate having an emissivity value of approximately 0.05 up to approximately 0.25 and a reflectivity value up to approximately 0.95, a first coating comprising unpigmented sodium silicate disposed on the substrate, wherein the first coating significantly increases the emissivity value of the substrate while decreasing the reflectivity value of the metal flake substrate a relatively small amount, and a second coating comprising sodium silicate loaded with reflective pigments non-uniformly disposed about the first coating of the metal flake substrate, wherein the finished flake has an emissivity value in excess of approximately 0.75 and a reflectivity value ranging from approximately 0.4 to approximately 0.5.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

While the invention is capable of various modifications and alternative forms, specific embodiments thereof have been shown by way FIGS. 1-12, and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DETAILED DESCRIPTION

Reference will now be made in detail to embodiments of the disclosed subject matter, an example of which is illustrated in the accompanying drawings. The disclosed subject matter will be described in conjunction with the detailed description of the system.

In accordance with the disclosed subject matter, a finished flake for a roofing material is provided having a metal flake substrate having an emissivity value of approximately 0.05 up to approximately 0.25 and a reflectivity value up to approximately 0.95. A first coating comprising unpigmented sodium silicate is disposed on the metal flake substrate, wherein the first coating significantly increases the emissivity value of the substrate while decreasing the reflectivity value of the substrate a relatively small amount. A second coating comprising sodium silicate loaded with reflective pigments non-uniformly is disposed about the first coating of the metal flake substrate, wherein the finished flake has an emissivity value in excess of approximately 0.75 and a reflectivity value ranging from approximately 0.4 to approximately 0.5.

Although not so limited in its application, the presently disclosed subject matter may be applied to roofing material, such as shingles. Solely for purpose of illustration, an exemplary embodiment of a roofing system 100 having a plurality of shingles 101 with finished flakes thereon, is shown schematically in FIG. 1. The examples herein are not intended to limit the scope of the disclosed subject matter in any manner. The roofing shingles 101 comprising the finished flakes can be any suitable shape, size, and dimension. The shingles 101 can comprise a substantially rectangular shape although other shapes such as, but not limited to, square, oblong, trapezoidal, chamfered, and the like are contemplated herein.

Figure 2A:
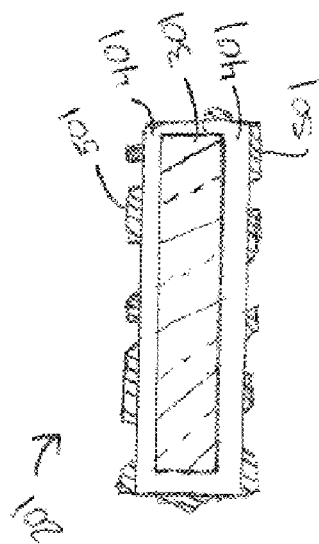
FIG. 2A is a cross sectional view of the finished flake of FIG. 2 taken at line Z, according to an embodiment of the disclosed subject matter.
Figure 2:
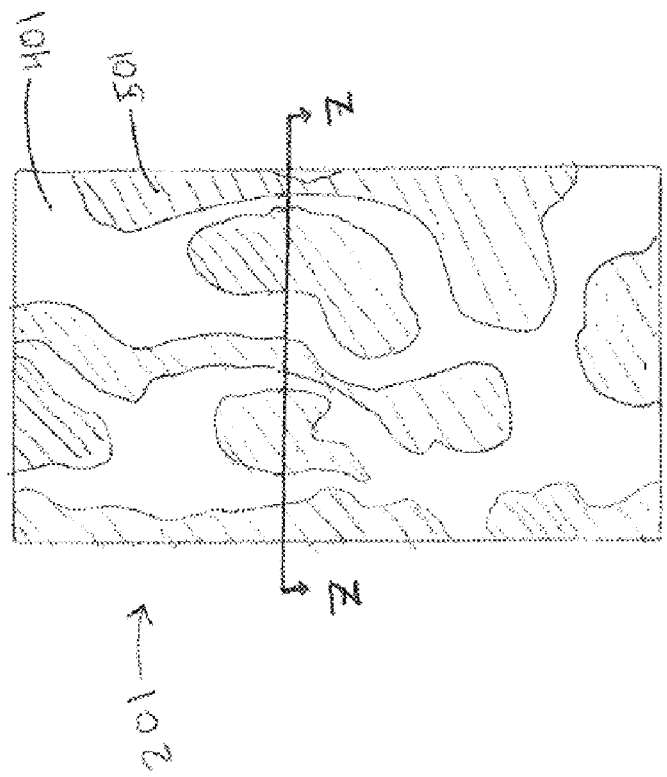
FIG. 2 depicts a magnified view a finished flake, according to an embodiment of the disclosed subject matter.

FIG. 2 depicts a magnified example of a finished flake 201 and FIG. 2A is a cross sectional view of the finished flake 201 of FIG. 2 taken at line 2A, according to an embodiment of the disclosed subject matter. With reference to FIGS. 2 and 2A, the finished flake 201 comprises a metal flake substrate 301, a first coating 401, and a second coating 501, as further discussed herein.

Metal Flake Substrate:

The metal flake substrate 201 provides the foundation of the finished flake. The substrate can be any suitable shape, size, and dimension that are useful for roofing or external material. The metal flake substrate of FIG. 2 is depicted as a substantially rectangular shape. However, the metal flake substrate can include other suitable shapes such as, but not limited to, square, oblong, trapezoidal, chamfered, polygonal, round, and the like. Furthermore, the border or perimeter of the metal flake substrate can be smooth. However, the flake can alternatively have an uneven or jagged perimeter. As depicted in FIG. 2, the metal flake substrate has a substantially smooth border with four corners approximately perpendicular.

Dimension and Shape:

The metal flake substrate can range in size and dimension depending on use. In one embodiment of the disclosed subject matter, the metal flake substrate is of a size ranging from greater than the approximate size of flakes passing through a U.S. Standard Sieve #50 up to approximately 1 inch. In other embodiments, the metal flake substrate can range from approximately 16 mesh to approximately 20 mesh. As such, the length and width dimensions of the metal flake substrate can range from approximately 10 mil to approximately 50 mil. In further embodiments of the disclosed subject matter, the length and width dimensions of the metal flake substrate can range up to approximately 100 mil. The size of the metal flake substrate can be determined based on the manufacturing of the substrate from a patterned forming surface, as known in the art. With the metal flake substrates of the smaller dimension range, such metal flake substrates are less discernable when incorporated with a shingle or roofing material, and the shingle has a higher density of flakes. Such shingles can exhibit a finer quality. With the metal flake substrates of the larger dimension range, such metal flake substrates are more visually apparent on shingles and are more discernable in comparison with a shingle having a smaller flakes. The smaller dimension flake substrates, may be more desirable for a standard shingle appearance. Depending on the distance of the observer to the shingle, larger flakes can be used while still exhibiting a premium quality. In certain embodiments, the finished flakes can create an artificial textured appearance.

The metal flake substrate can have any suitable thickness dimension and can range from approximately 0.5 mil to approximately 1.5 mil. Metal flake substrates having a thicker dimension can exhibit stronger characteristics with less potential deformation, although such metal flake substrates can be more prone to sticking together during coating processes. Metal flake substrates at the lower thickness dimension range are less likely to agglomerate, but can tear in subsequent coating processes and thus become smaller in size dimension.

Topography:

The metal flake substrate can have any suitable topography that can be coated. In an embodiment of the disclosed subject matter and as depicted in FIG. 2A, the metal flake substrate is substantially flat. The flat topography of the flake enables for easier and more uniform coating of the metal flake substrate. However, the topography of the metal flake substrate can be varied and non-uniform across the exterior surface thereof. As such, the exterior surface of the metal flake substrate can also be wavy and irregular. In such embodiments, the irregular exterior surface can allow for better thermal properties.

Materials of Construction:

The metal flake substrate can comprise aluminum or an aluminum alloy. However, the metal flake substrate can comprise any suitable metal for the roofing/exterior siding industry. Non-limiting examples include aluminum, brass, bronze, copper, lead, stainless steel, steel, tin, zinc, and alloys thereof, or any other desired metal. The metal flake substrate may be made from recycled metal to lower the cost of the roofing material.

Flake Substrate Characteristics:

Metal flake substrates comprising aluminum or aluminum alloy exhibit some desired characteristics in the roofing/exterior siding industry. Aluminum or aluminum alloy metal flake substrates can have high solar reflectivity, which is desirable in the roofing/exterior siding industry, but can also have low emissivity, which can be undesirable. Aluminum can also withstand the curing temperature of silicates and can maintain its structural integrity during the coating processes. In use as a finished flake coupled to an asphalt shingle material, the flake serves as an ultraviolet blocking agent that can protect the underlying asphalt shingle material. An aluminum metal flake substrate can have an emissivity value up to approximately 0.25, and in particular can be approximately up to 0.05. In other embodiments of the disclosed subject matter, oxidized aluminum flakes or even weathered aluminum flakes can be used for certain applications wherein the emissivity of such weathered aluminum flake can be up to approximately 0.75. To increase the emissivity of the aluminum metal flake substrate, the substrate can be oxidized to obtain an emissivity value up to approximately 0.75, if desired and depending on use. In an embodiment of the disclosed subject matter, the aluminum metal flake substrate can have a reflectivity value up to approximately 0.75. According to other embodiments of the disclosed subject matter, the aluminum metal flake substrate comprising aluminum foil can exhibit reflectance up to approximately 85 percent to 88 percent in white light. In further embodiments, the reflectance of the aluminum metal flake substrate can reach in excess of approximately 90 to approximately 95 percent reflectance, such as with aluminum mirrors made from thin coatings. Application of one or more coatings to the metal flake substrate can alter the emissivity and reflectivity values, as further discussed herein.

First Coating:

The metal flake substrate can be coated with a first coating. The first coating can be a primer. In the embodiment of FIGS. 2 and 2A, the metal flake substrate 301 has a first coating 401 on all sides of the substrate. In other embodiments, the metal flake substrate can be coated on one side (not shown).

The first coating can comprise any suitable substance disposed on the substrate. According to an embodiment of the disclosed subject matter, the first coating can comprise unpigmented sodium silicate. Non-limiting examples of other suitable first coatings include metal silicates such as those formed using soda ash, caustic, or other processes, and silicon dioxide. The ratio of the silicon dioxide to sodium oxide can range from approximately 2 to 1 to approximately 3.75 to 1. The first coating can furthermore be subjected to additives, such as, but not limited to, internal or external setting agents, as known in the art, such as for purposes of example, and not limitation, acidic compounds, such as mineral or organic acids, carbon dioxide gas, and acid salts such as sodium bicarbonate and monosodium phosphate, calcium chloride, magnesium sulfate, aluminum sulfate, borax, sodium metaborate, zinc oxide or sodium silico fluoride, and Kaolinitic clays and minerals.

The first coating can have a viscosity of approximately 4,000 centipoise (Cp) and can be applied to the substrate at a suitable temperature ranging from approximately 175° F. to approximately 250° F. The first coating can have a range of suitable viscosity and for purposes of example, can range approximately from 250 Cp to 7,000 Cp. The viscosity of the first coating can be adjusted to control spray conditions. The temperature at which the first coating is applied can differ depending on the spray rate and the concentration of the first coating. However, after the first coating is applied, before curing, the metal flake substrate with the first coating receives a chemical setting agent, such as 5 percent sodium bicarbonate as known in the art, followed by a second coating as further discussed herein below. Generally, after all coatings and agents are applied, the curing can occur. Curing after the application of the first coating can promote the substrates to fuse together. The first coating can be applied to the substrate by any suitable method, such as with a fluidized bed coater and such as the method of coating described in U.S. Publication No. 2012/0270015, entitled "Colored Metal Flake Surfaced Roofing Materials", the contents of which is incorporated by reference in its entirety.

FIG. 2A shows the first coating 401 applied to an exterior surface of the substrate 301. As shown, the first coating is substantially uniformly disposed on the substrate 301 such that the approximate entire exterior surface area of the substrate is coated with the first coating. The first coating can have any suitable thickness dimension and can range from approximately 0.5 mil to approximately 1.5 mil. Metal flake substrates having a thicker dimension for the first coating can have a more uniform coating and can have a higher emissivity value. In contrast, metal flake substrates at the lower thickness dimension range for the first coating can increase the emittance of the metal flake substrate enough for the first coat to coat the surface area of the substrate. The first coating can comprise as much as approximately 40 percent of the weight of the metal flake substrate.

Figure 3:
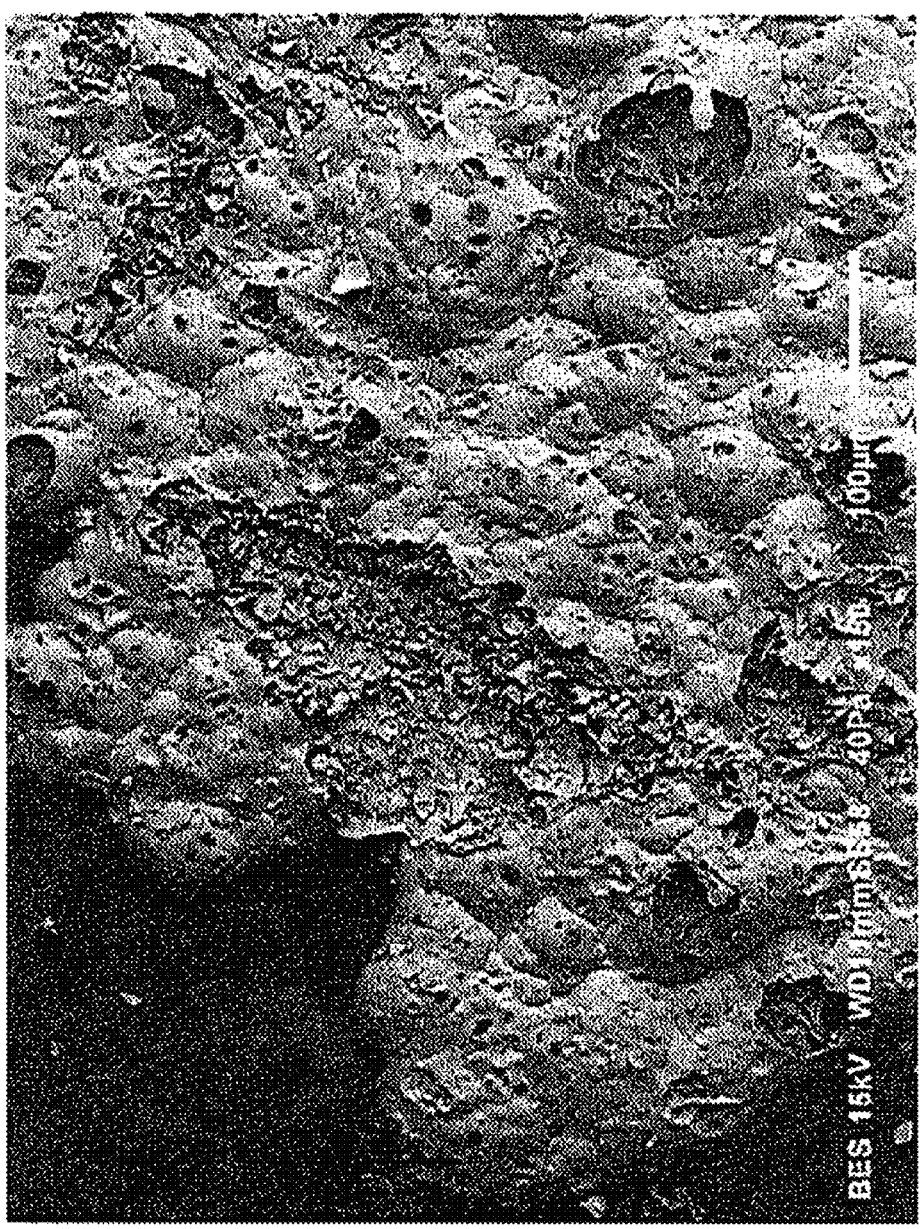
FIGS. 3 and 4 are scanning electron microscope (SEM) photomicrographs of an aluminum metal flake substrate having a first coating, according to an embodiment of the disclosed subject matter.
Figure 4:

FIGS. 3 and 4 are scanning electron microscope (SEM) photomicrographs of an aluminum metal flake substrate having a first coating of clear, colorless, unpigmented sodium silicate uniformly disposed and cured thereon. As shown, the first coating, when cured prior to application of a second coating, generates a void structure on the exterior surface of the aluminum. The void structure can further perform as an insulator for heat or flame, in such a manner as perlite is used in the industry. The void structure can comprise varying degrees of voids in the flake, as shown in FIGS. 3 and 4. As such, the first coating can comprise an exterior textured surface but can also be relatively smooth.

Figure 5:
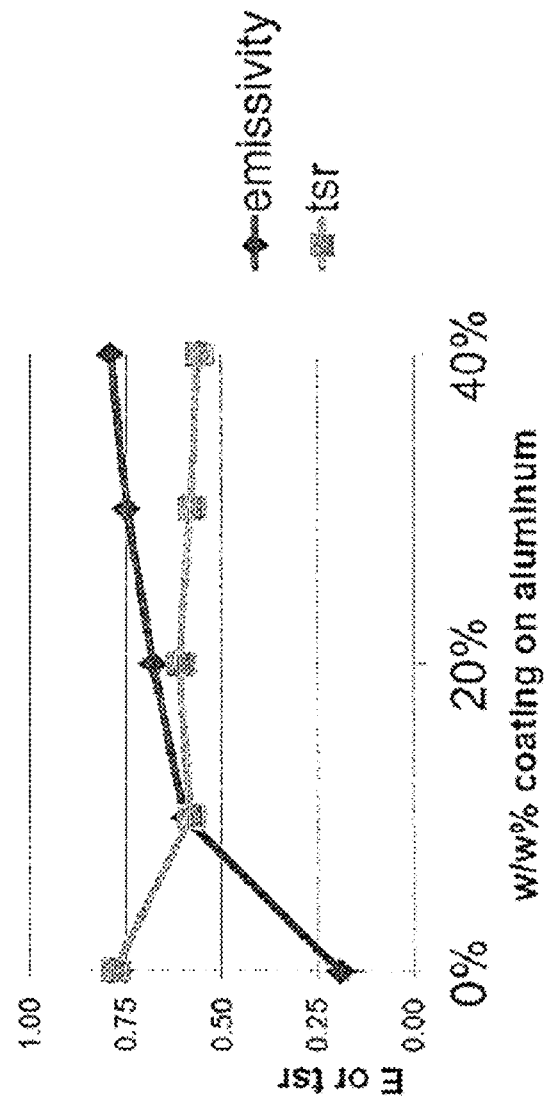
FIG. 5 is a graph showing the effect of a first coating of unpigmented sodium silicate on an aluminum metal flake substrate, according to an embodiment of the disclosed subject matter.

The first coating, such as unpigmented sodium silicate, can markedly increase the emissivity value of the substrate, while decreasing the reflectivity value of the substrate by a relatively small amount, which provides some desirable effects in the roofing/exterior siding industry. FIG. 5 is a graph showing the effect of a first coating of unpigmented sodium silicate on an aluminum metal flake substrate applied in amounts measured as a percentage of the weight of the metal flake substrate, according to an embodiment of the disclosed subject matter. The sodium silicate used in this example is D® sodium silicate, as manufactured by PQ® Corporation of Valley Forge, Pa. The first coating causes a relatively slight decrease in reflectance to approximately 50 percent, whereas the emittance increases to over approximately 75 percent with an application of approximately 40 percent of the weight of the metal flake substrate. In comparison, with aluminum metal flake substrates having pigmented coating alone, pigmented coating in an amount about 80 percent of the weight of the metal flake substrate would be required to reach the same emittance as the flakes of the disclosed subject matter using half the amount of the pigmented coating in a second layer, and the reflectance of the single pigment layer (i.e. monolayer) flake would be lower at approximately 44 percent. As such, FIG. 5 shows the unexpected results of the effects of the first coating on the aluminum metal flake substrate.

Chemical Setting Agent:

The first coating can further comprise a chemical setting agent after application The application of the chemical setting agent can render the first coating material insoluble in embodiments of the disclosed subject matter. The chemical setting agent can comprise for purposes of example and not limitation, at least one of sodium bicarbonate or sodium tetraborate. The use of a chemical setting agent can positively enhance the reflectivity and emissivity of the finished flake. The use of a chemical setting agent can also affect the thickness of the first coating. The chemical setting agent can be a component of the first coating, such as an internal setting agent, or can be applied after the first coating is deposited on the metal flake substrate. In one example as discussed below with respect to FIG. 9, the chemical setting agent is sprayed after the spraying of the first coating.

Figure 9:
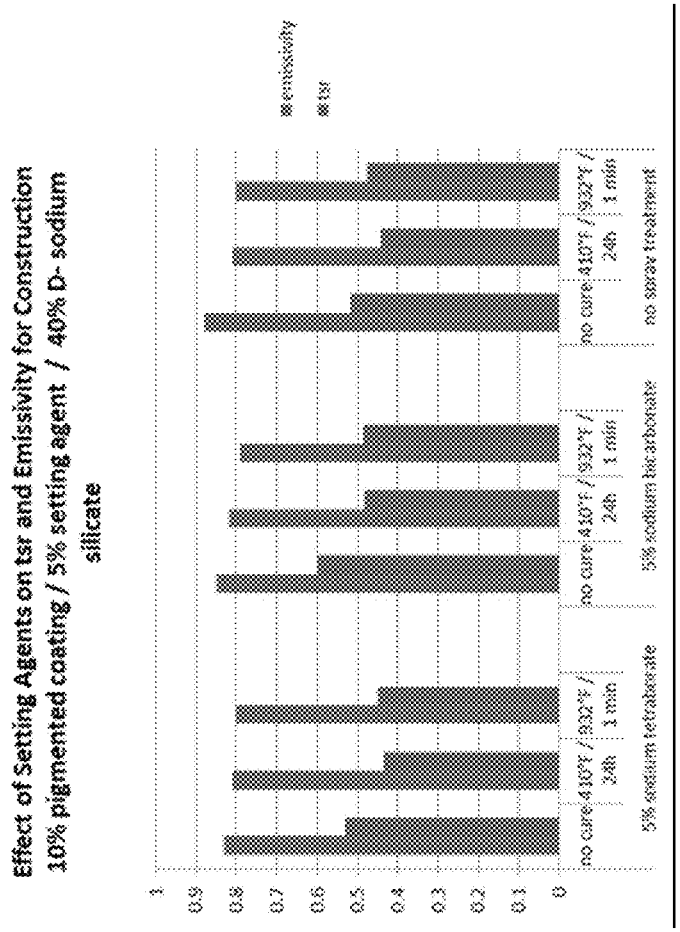
FIG. 9 depicts a bar chart showing the effect of curing temperatures and times with respect to a chemical setting agent for determining the reflectivity and emissivity values, according to an embodiment of the disclosed subject matter.

The chemical setting agent can comprise approximately 5 percent of the weight of the metal flake substrate, as shown in FIG. 9, but the chemical setting agent can also range from 0.1 percent of the weight of the metal flake substrate up to 3 percent of the weight of the metal flake substrate. In this example of FIG. 9, the setting agent is a 5 percent solution of sodium bicarbonate applied as approximately 1.3 percent of the weight of the metal flake substrate, the first coating is applied in an amount that is approximately 40 percent of the substrate weight, and the second, pigmented coating with an internal setting agent (discussed in greater detail below) is applied in an amount that is approximately 10 percent of the metal flake substrate weight.

Second Coating:

As depicted in FIGS. 2 and 2A, the finished flake 201 further comprises a second coating 501 on both sides of the flake. As depicted, FIG. 2A shows the second coating 501 applied to the first coating 401 thereon disposed on the surfaces of the substrate 301. As shown, the first coating is substantially uniformly disposed on the substrate 301. Unlike the first coating 401, the second coating 501 is non-uniformly disposed about the first coating 401 on the metal flake substrate 301. As such, both the first coating 401 and the second coating 501 are exposed to an external environment.

The second coating can comprise any suitable substance. According to an embodiment of the disclosed subject matter, the second coating 501 can comprise sodium silicate loaded with reflective pigments. Non-limiting examples of other suitable second coatings include polyvinylidene fluoride (PVDF), silicone-acrylics, silicones, urethanes, non-reflective silicate pigmented coating, and any other coating suitable to withstand weathering on a roof for several decades. Performance of a non-reflective, second coating can be measured by the reflectivity gained from opacity or partial flake over the aluminum flake substrate. The second coating can furthermore include additives, such as, but not limited to, mineral fillers, reflective pigments, adhesion promoters, viscosity modifiers, and other pigments.

The second coating can furthermore comprise, by way of example only, approximately 30 percent to approximately 45 percent pigment. The pigments can include any desired pigment in any desired amount to create a plurality of different colors for the finished flake. Non-limiting examples of suitable pigments include chromium iron oxide, C.I pigment brown 24, iron oxide, ultramarine blue, zinc ferrite brown spinel, chrome oxide, and titanium dioxide.

The second coating can have a viscosity of approximately 4,000 Cp and can be applied to the first coating on the metal flake substrate at a temperature ranging from approximately 175° F. to approximately 250° F. The second coating can be applied to the substrate over the first coating by any suitable method, such as with a fluidized bed coater and as described above with respect to the coating methods of the first coating.

The second coating can have any suitable thickness dimension and can range from approximately 0.10 mil to approximately 0.20 mil. Metal flake substrates having a thicker dimension for the second coating can exhibit improved color uniformity characteristics, whereas metal flake substrates at the lower thickness dimension range for the second coating are optionally slightly lighter and can benefit more from the reflectivity of the aluminum metal flake substrate. It is possible to vary the coating thickness to control shade of color as the base aluminum metal flake substrate can have a white appearance. According to an embodiment of the disclosed subject matter, the second coating can comprise approximately 10 percent of the weight of the metal flake substrate. In another embodiment, the second coating is approximately 40 percent of the weight of the metal flake substrate. In comparison, with aluminum metal flake substrates having pigmented coating alone, pigmented coating in an amount about 80 percent of the weight of the metal flake would be required to reach the same emittance but reduced reflectance. As such, embodiments of the disclosed subject matter reduce the amount of pigment needed for comparable flake characteristics.

Figure 6:
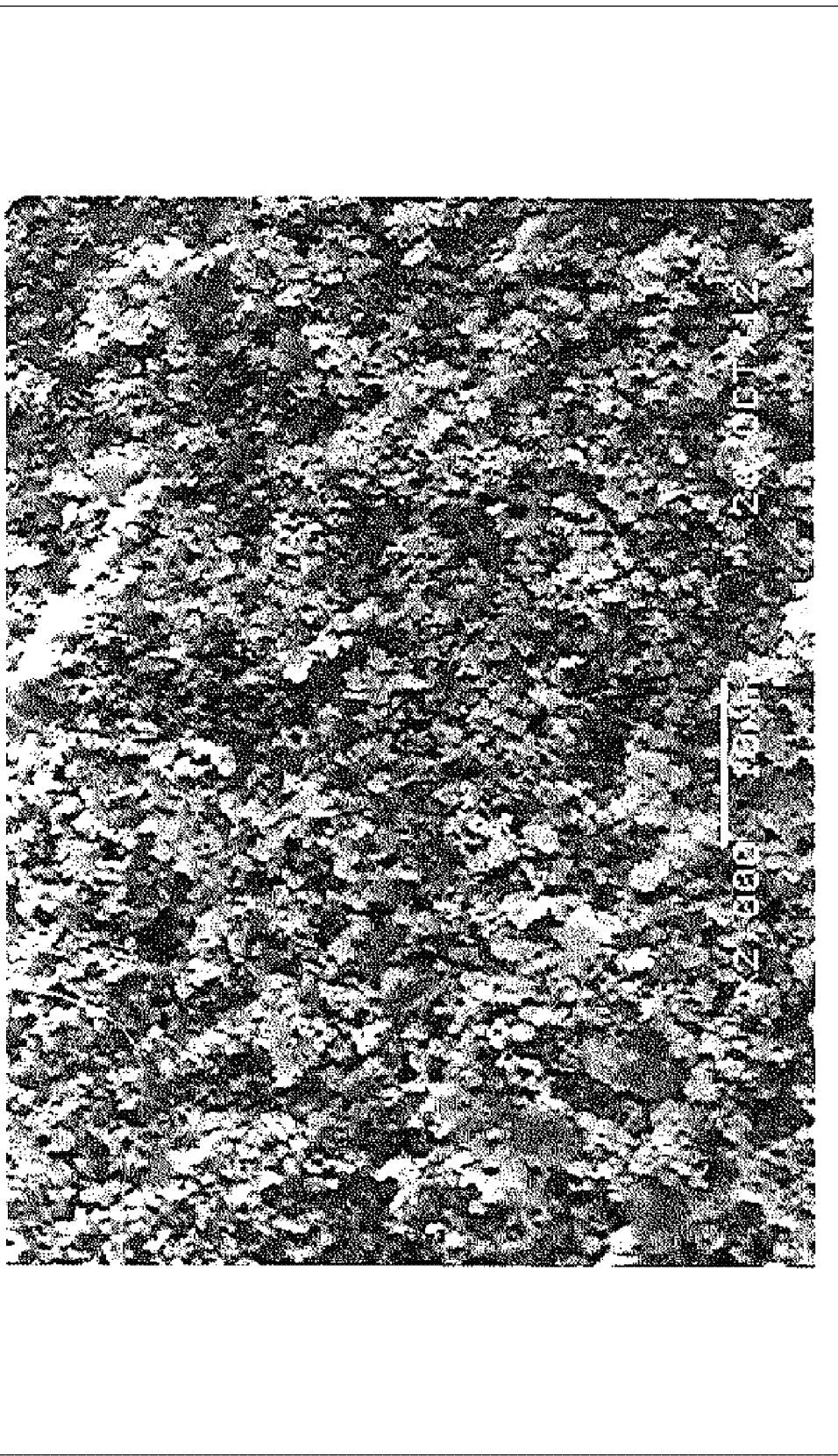
FIG. 6 depicts an SEM photomicrograph of the aluminum metal flake substrate with the first coating of FIGS. 3 and 4, along with a second coating non-uniformly disposed and cured thereon, according to an embodiment of the disclosed subject matter.
Figure 12:
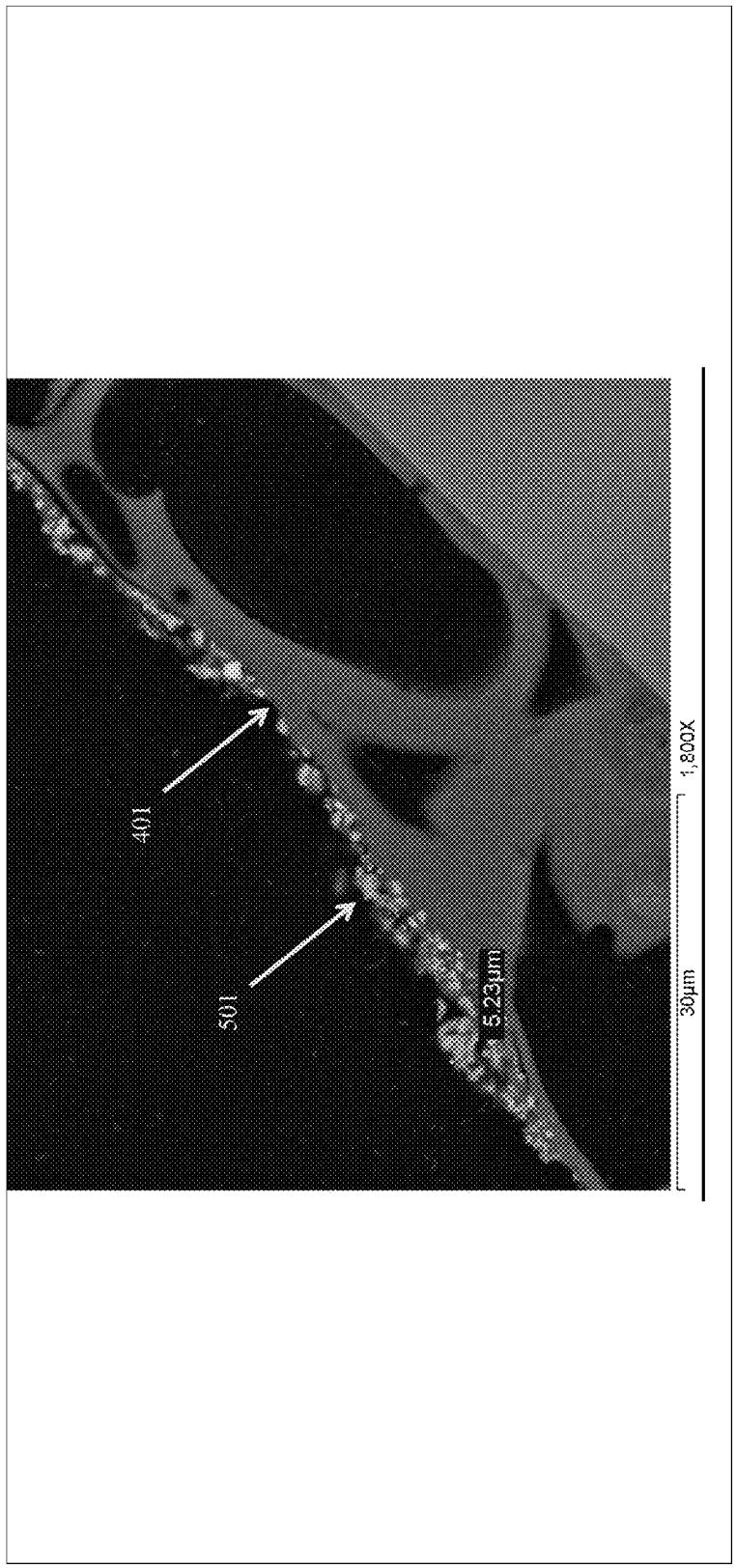
FIG. 12 depicts a SEM micrograph of a second coating on a first coating of an aluminum metal flake substrate, according to an embodiment of the disclosed subject matter.

FIG. 6 depicts an SEM photomicrograph of the aluminum metal flake substrate with the first coating of FIGS. 3 and 4, along with a second coating non-uniformly disposed and cured thereon. As shown, the second coating, when cured, adds a finer structure to the surface than the silicate first coating primer alone. This detail can furthermore be seen by the cross-section in FIG. 12, where the outermost layer is the coarser pigmented layer, as further described below. As depicted in FIG. 12, the voided structure of the exterior surface of the finished metal flake further enhances the insulating properties of the flake by creating a larger surface area of the exterior surface. As such, the second coating can further comprise a rough textured surface as shown in FIG. 6 and FIG. 12. FIG. 6 also shows regions of uncoated segments of the first layer, and FIG. 12 also shows the non-uniformity of the second coating about the first coating.

Chemical Setting Agent:

The second coating can further comprise a chemical setting agent applied thereto, or can comprise an internal chemical setting agent. In the example of FIG. 9, a kaolin clay internal setting agent was applied, which generates acid at curing temperatures and further contributes to the rough exterior surface of the flake. It is desirable not to contaminate the optical clarity of the entire first layer with kaolin clay and block the reflectivity of the aluminum surface, hence an external acid spray can be used. As such, the use of a chemical setting agent can positively enhance the reflectivity and emissivity of the finished flake. The chemical setting agent can be a component of the second coating, or can be applied separately or simultaneous with the second coating.

Finished Flake:

The first coating and the second coating together can comprise a finished flake coating having a thickness dimension ranging from approximately 20 microns to approximately 40 microns. When a chemical setting agent is used in conjunction with the first coating, the chemical setting agent can comprise approximately 1.3 percent of the weight of the metal flake substrate, whereas the unpigmented sodium silicate first coating can comprise approximately 40 percent of the weight of the metal flake substrate and the second coating can comprise approximately 10 percent of the weight of the metal flake substrate.

Figure 7:
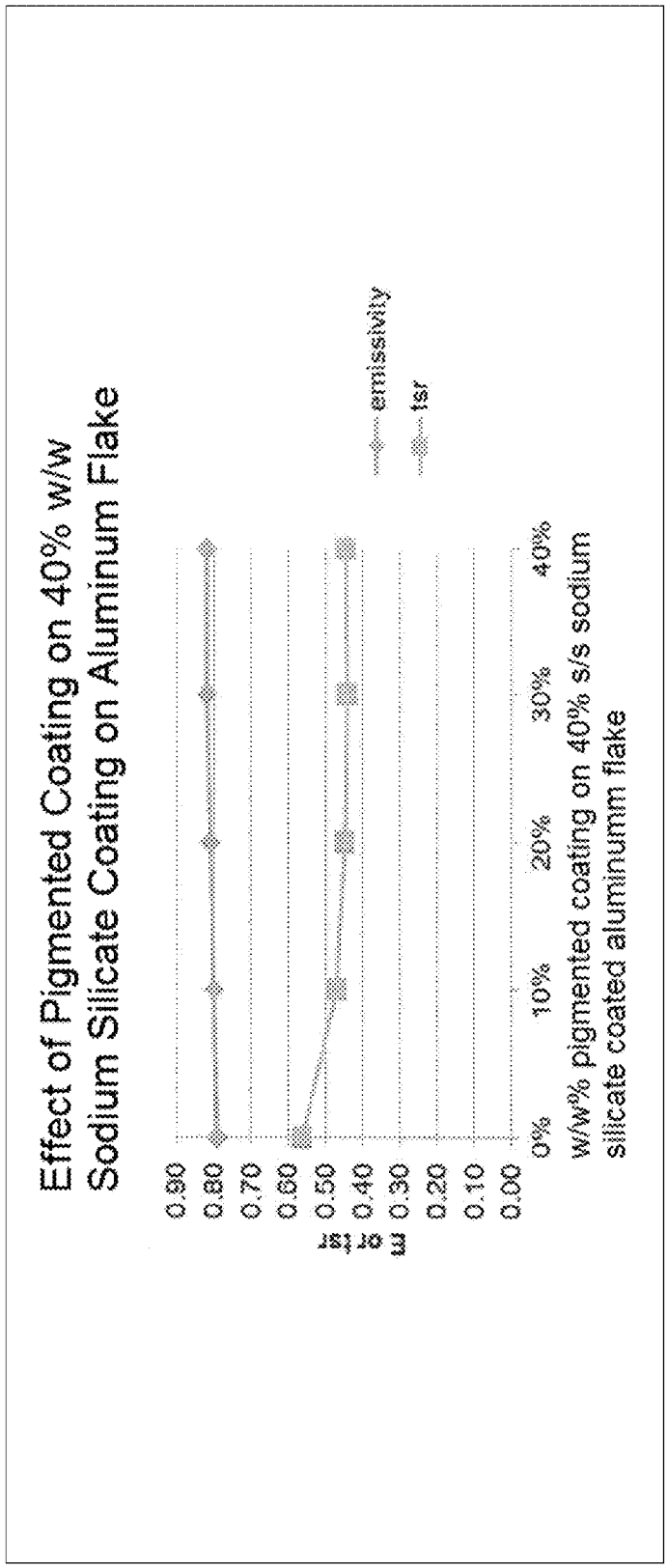
FIG. 7 is a graph showing the effect of a second coating disposed about the first coating on the aluminum flake substrate of FIG. 5, according to an embodiment of the disclosed subject matter.

The further application of the second, pigmented coating provides desired aesthetic effects and can additionally enhance the emissivity value of the finished flake while decreasing the reflectivity value of the finished flake by a relatively small amount. In one embodiment, the finished flake has an emissivity value in excess of approximately 0.75 and a reflectivity value ranging from approximately 0.4 to approximately 0.5. FIG. 7 is a graph showing the effect of the second coating disposed about the first coating on the aluminum flake substrate of FIG. 5. The second coating used in FIG. 7 comprises a pigment-loaded sodium silicate coating. In FIG. 7, the graph unexpectedly shows that at an application of 10 percent of the weight of the metal flake substrate of the pigmented second coating, the finished flake properties begin to plateau. In comparison, with aluminum metal flake substrates having a monolayer of pigmented coating alone, application of 80 percent of the weight of the substrate of the pigmented coating would be required to reach the same emittance and approximately similar reflectance. Moreover, the metal flakes can be tailored with the second coating to achieve any desired aesthetic appearance, such as an appearance of any metal or stone. As such, according to embodiments of the disclosed subject matter, the first coating allows for much less pigmented coating for the second coating than would otherwise be needed to achieve the same desired aesthetic, solar, and thermal characteristics.

In other embodiments of the disclosed subject matter, the metal flake substrate can be coated with the first coating alone to generate a finished flake needed for generating high reflectivity flakes.

Figure 1:
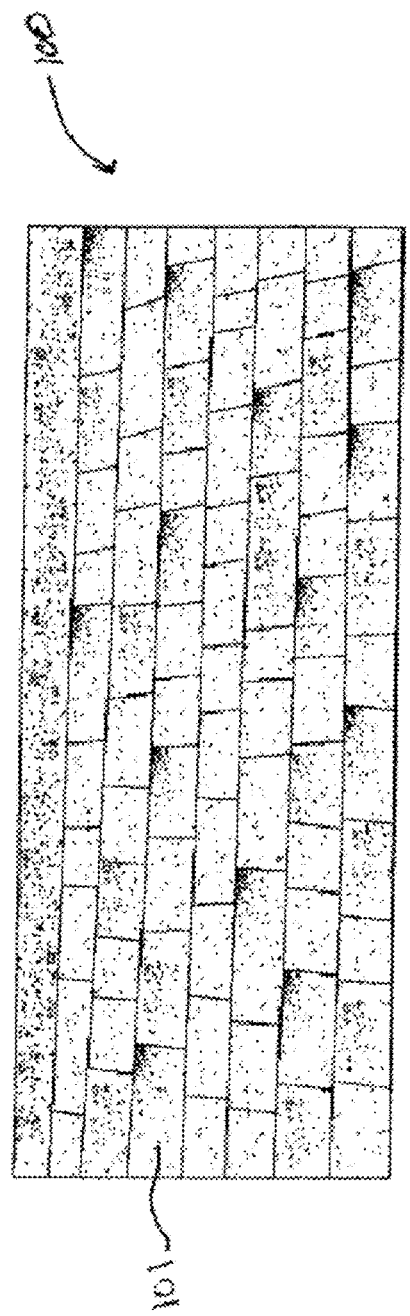
FIG. 1 shows a partial section of a roofing system having shingles with finished flakes thereon, wherein nearly the entire weathering surface of the shingle has been covered with finished flakes, according to an embodiment of the disclosed subject matter.

Application of Flakes:

The finished flake can be suitable for use as a roofing material, as shown in FIG. 1. The finished flakes can be adhered to a base, such as a shingle, in a manner similar to the application of granules as commonly known in the art. The finished flake can be applied to the shingle using equipment standard to the art, as persons of ordinary skill in the art will understand. As such, embodiments of the disclosed subject matter include a roofing material, comprising, amongst other things, a shingle material; and a plurality of finished flakes disposed about the shingle material, wherein each finished flake includes a metal flake substrate having an emissivity value of approximately 0.05 up to approximately 0.25 and a reflectivity value up to approximately 0.95, a first coating comprising unpigmented sodium silicate disposed on the metal flake substrate, wherein the first coating significantly increases the emissivity value of the substrate while decreasing the reflectivity value of the substrate a relatively small amount, and a second coating comprising sodium silicate loaded with reflective pigments non-uniformly disposed about the first coating of the metal flake, wherein the finished flake has an emissivity value in excess of approximately 0.75 and a reflectivity value ranging from approximately 0.4 to approximately 0.5.

The finished flakes according to the disclosed subject matter can be used to surface roofing materials that more readily meet or exceed desired thresholds for reflectance and emittance, such as the minimum California Code of Regulations Title 24 requirements of reflectance of 25 percent and an emittance of 75 percent for asphaltic shingles. Typically, reflectance of 20 percent is the aged target. Usually, a higher value of reflectance is desired to combat soiling. The roofing materials can be in various forms including, for example, roofing shingles, roofing tiles, roll roofing, commercial cap sheets, modified bitumen cap sheets, shakes and sidewalls, although these other products can carry their own minimums for Title 24 acceptance, as understood in the art.

Method of Making:

Details regarding the method of making a finished flake and the roofing material of the disclosed subject are understood from the detailed description above. The method of making a finished flake for a roofing material generally includes, amongst other things, providing a metal flake substrate having an emissivity value up of approximately 0.05 to approximately 0.25 and a reflectivity value up to approximately 0.95; applying a first coating comprising unpigmented sodium silicate to the metal flake substrate, wherein the first coating significantly increases the emissivity value of the substrate while decreasing the reflectivity value of the substrate a relatively small amount; applying a second coating comprising sodium silicate loaded with reflective pigments non-uniformly about the first coating of the metal flake substrate; and curing the first coating and the second coating, wherein the finished flake has an emissivity value in excess of approximately 0.75 and a reflectivity value ranging from approximately 0.4 to approximately 0.5.

The method further includes applying the first coating on the substrate by spraying the first coating on the substrate. The applying the second coating on the substrate can furthermore include spraying the second coating on the first coating. A fluidized bed coater can also be provided such that the fluidized bed coater applies the first coating on the substrate and applies the second coating on the first coating of the substrate.

EXAMPLES

The following examples are presented to further exhibit the unexpected results on the reflectivity and emissivity of a finished flake having the first and second coating. The examples are merely illustrative and not meant to be exhaustive.

Figure 8:
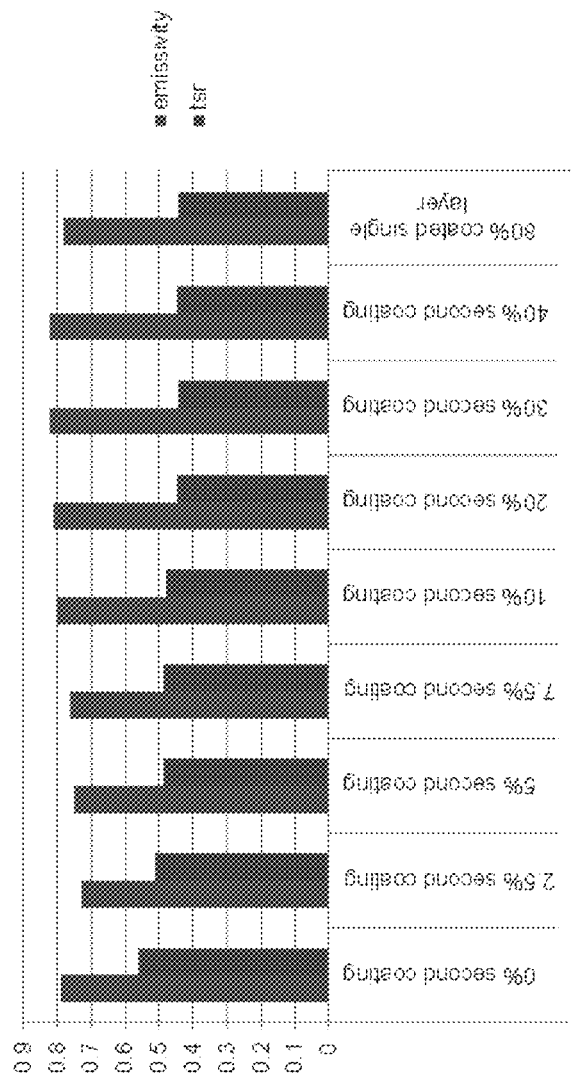
FIG. 8 depicts a bar chart showing the effect of reducing the pigmented coating on a base of sodium silicate on reflectivity and emissivity, according to an embodiment of the disclosed subject matter.

FIG. 8 depicts a bar chart showing the effect of reducing the pigmented second coating on a base of sodium silicate first coating with respect to reflectivity and emissivity for the construction of a finished flake. The finished flake according to the chart of FIG. 8 has varying examples of pigmented second coating percentages of the second coating disposed on an aluminum metal flake having a D®-sodium silicate first coating applied at 40 percent of the weight of the flake, in comparison with a monolayer pigmented coated aluminum flake with the coating applied at 80 percent of the weight of the flake. In this embodiment, the second coating comprises pigmented sodium silicate. However, as noted herein, the second coating can include solar and thermally reflective pigments, silicate binder, and filler. An example of a suitable pigment are those as manufactured by Specialty Granules Inc. As shown, for purposes of comparison, the physical properties of half of an 80 percent w/w pigmented single or monolayer can be exceeded by embodiments of the disclosed subject matter of having an aluminum metal flake with a first coating having a clear base layer, as previously disclosed, along with using a minimal amount of a pigmented second coating.

The monolayer pigmented coating example of FIG. 8 has a rough surface texture and emissivity of near 0.78. The silicate-only coated flake surface measures 0.79 emissivity even though relatively smooth. The examples coated with a pigmented second coating at less than 10 percent of the metal flake substrate weight sustain a relatively high initial drop in emissivity. At 10 percent or greater, the emissivity exceeds that of the monolayer of pigmented coating. The approximately 30 to approximately 40 percent examples of the flake show maximum emissivity values.

Figure 8A:
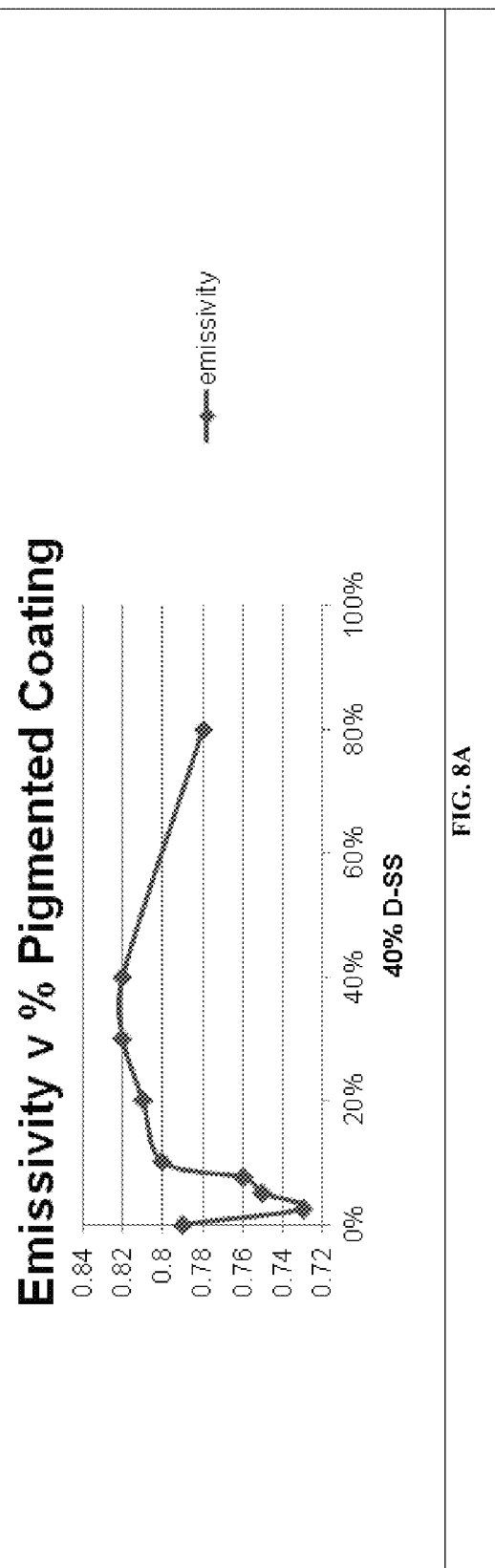
FIG. 8A and FIG. 8B depict graphical representations of the data of FIG. 8, according to an embodiment of the disclosed subject matter.
Figure 8B:
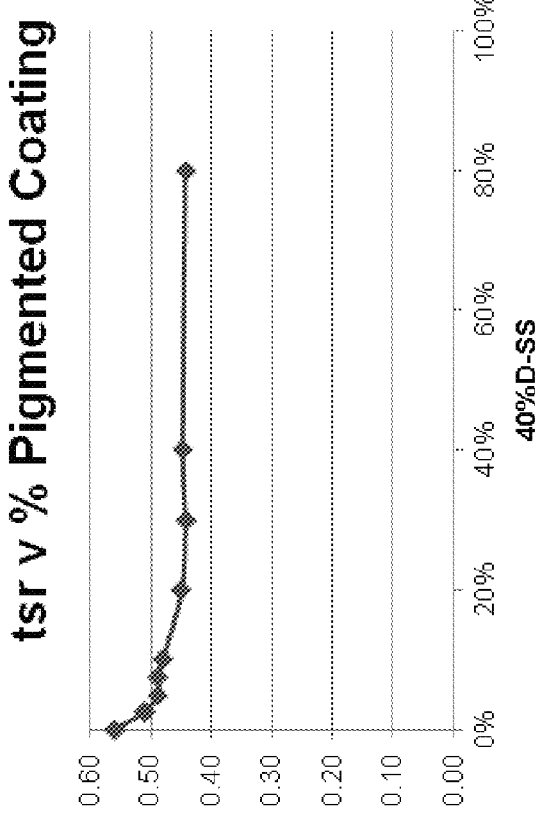

FIG. 8A and FIG. 8B depict graphical representations of the data of FIG. 8. The emissivity curve of FIG. 8A shows a complex response to the addition of the second, pigmented coating. The emissivity of the top layer is greater than or equal to 0.75 at about 5 percent and greater; where the solar reflectance is maximized at about 30 percent and lower. As such, a coated two-layer flake is created with approximately 5 percent to 30 percent coating having better properties than a monolithic coated flake. The 5 percent coated versions would appear lighter in color whereas the 30 percent coated versions would appear similar in color to the monolithic coated flake. As such, the pigment of the second coating tested in this example can be used to make dark and light versions of a color using the opacity of the second layer disposed about the first coating silicate layer for lower cost and better emissive and tsr characteristics, than the monolayer of 80 percent w/w pigmented material of the flake. Accordingly, embodiments of the disclosed subject matter decrease the need for $TiO_2$ pigment in the coating while at the same time reducing the amount of coating needed. The monolayer pigmented flake contains $TiO_2$ pigment for reflectance purposes, which is highly reflective and a white pigment. As known in the art, $TiO_2$ pigment is a common ingredient to coatings of standard granulate covered shingle materials as well. In order to gain desired reflectance properties, the colors of the monolayer flake are lighter due to the amount of $TiO_2$ used with the monolayer flake. An advantage of the finished flake according to the disclosed embodiment, is the use of less pigment. The finish flake has flatter surface exposure which can also lessen the amount of $TiO_2$ needed as more reflective pigment can be used, while maintaining similar costs as the monolayer flake. As such, a darker color pigmented finished flake can be created and the color intensity can be modulated by the level of coating. Thus, the need for multiple pigmented coating preparations and compositions can be eliminated with embodiments of the disclosed subject matter.

Because the pigmented second coating can have reduced film forming properties with respect to the process of coating, embodiments of the disclosed subject matter can utilize approximately 30 to approximately 40 percent w/w of pigmented second coating on top of a 40 percent w/w first coating silicate base to cover the flake substrate completely and level out reflectivity. Accordingly, such benefits are evidenced in color measurements where color consistency begins at the approximately 30 to approximately 40 percent w/w of pigmented second coating. With the comparative pigment monolayer of the flake, such flake has good reflectivity but poor emissivity, because 80 percent pigmented w/w coating is needed to improve emissivity which suggests opacity characteristics in the example of approximately 30 to approximately 40 percent of pigmented second coating on top of a 40 percent first coating silicate base.

The determinants for coating selection of a flake substrate can include considerations such as cost, color, and performance. The current standard (2013) for shingle roofs requires greater than or equal to 0.75 emissivity, as noted in the Title 24 Building Standards Code. The reflectivity (tsr) is desired to be as high as possible, but multiple finished flake colors can be averaged to meet desired properties. The color effect below 30 percent w/w pigment can affect lightness, but not have an effect on true color. Therefore, achieving a very dark color is more difficult below the approximately 30 to approximately 40 percent w/w of pigmented second coating layer with certain embodiments of the disclosed subject matter; however, the 40:40 finished flake (40 percent w/w first coating layer of sodium silicate and a 40 percent w/w second coating layer of pigmented silicate disposed on a metal aluminum flake substrate) is a much more efficient way to make a dark pigment than an 80 percent w/w pigmented monolayer comparative flake, and the 40:40 finished flake has better emissivity than the monolayer comparison.

FIG. 9 depicts a bar chart showing the effect of curing temperatures and times with respect to the chemical setting agents for determining the reflectivity and emissivity values for the construction of an example finished flake having a 10 percent pigmented second coating, a 5 percent chemical setting agent of sodium tetraborate, sodium bicarbonate, or no agent at all, and a 40 percent D®-sodium silicate (D®-SS) as the first coating about an aluminum metal flake substrate. The chart shows the positive effect of the chemical setting agent sodium bicarbonate on the reflectivity. In the example with the chemical setting agent having sodium bicarbonate, the first coating of D®-SS is sprayed on first, which is followed by a separate 5 percent w/w solution of sodium bicarbonate chemical setting agent in water in comparison to the original aluminum weight of the substrate. The amount of the chemical setting agent in this example was 1.3 percent dry w/w compared to the original aluminum weight of the metal flake substrate. Next, the second pigmented silicate coating was added followed by condition of cure. As such, the finished flake included 100 percent aluminum flake substrate, 10 percent pigmented D®-SS, 1.3 percent sodium bicarbonate, and 40 percent D®-SS for a total of approximately 151.3 percent dry materials. In this example, the setting solution comprises 50 g of sodium bicarbonate per 1000 g of solution.

As evident by FIG. 9, the curing conditions of the coatings can affect the thickness of each coating layer. For example, the curing conditions can affect the thickness of the raw silicate first coating layer as noted in the following table:

| Sodium Silicate Thickness Readings, in Microns | | | | | |
| --- | --- | --- | --- | --- | --- |
| 410° F./24 hr cure | | | 932° F./ 1 min cure | | |
| Lot A-Control | Lot A-Bicarb | Lot A-Borax (sodium tetraborate) | Lot B-Control | Lot B-Bicarb | Lot B-Borax (sodium tetraborate) |
| 39.9 | 37.2 thicker | 25.7 | 25.4 | 18.9 thinner | 21.7 |

Figure 10B:
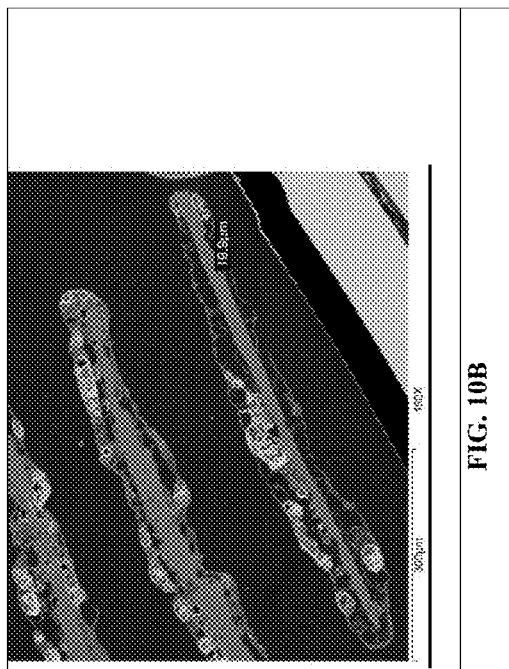
FIG. 10B depicts a SEM photograph of the sodium silicate first coating layer cured at 932° F., according to an embodiment of the disclosed subject matter.
Figure 10A:
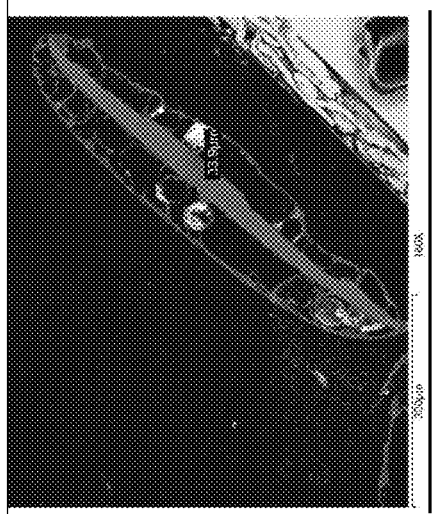
FIG. 10A depicts a SEM photograph of the sodium silicate first coating layer cured at 410° F., according to an embodiment of the disclosed subject matter.

FIG. 10A depicts a SEM photograph of the sodium silicate layer cured at 410° F. over a period of 24 hours having the specifications noted in the above table. In contrast, FIG. 10B depicts a SEM photograph of the sodium silicate layer cured at 932° F. over a period of 1 minute having the specifications noted in the above table. In these examples, a first coating of D®-SS is applied to an aluminum flake followed by a second coating, with no chemical setting agent in between prior to curing. During the curing step after the application of the first coating and the curing of the second coating, gas bubbles are formed in the first coating. The fast temperature increase to 932° F. of FIG. 10B allows for the release of gas and formation of lower thickness of the finished flake. The finished flake cured 410° F. of FIG. 10A is substantially similar to the finished flake of FIG. 10B except that the flake of FIG. 10A has a thickness dimension of 33.9 microns whereas the finished flake of FIG. 10B has a thickness dimension of 19.9 microns. The finished flake of FIG. 10A is more blistered or foamed.

With each example, the aluminum is kept below its melting point. However, application of sodium silicate to other substrate materials is possible, because the cure temperature can be decreased to below the degradation point of a substrate, such as a nonmineral-based material. The embodiment of FIG. 10B exhibits a thinner dimension than the embodiment of FIG. 10A. This means that thinness dimension can be advantageous, because less finish coating is required for the same coverage. However, depending on the use and need of the finished flake, either embodiment could be used according to embodiments of the disclosed subject matter.

Figure 11:
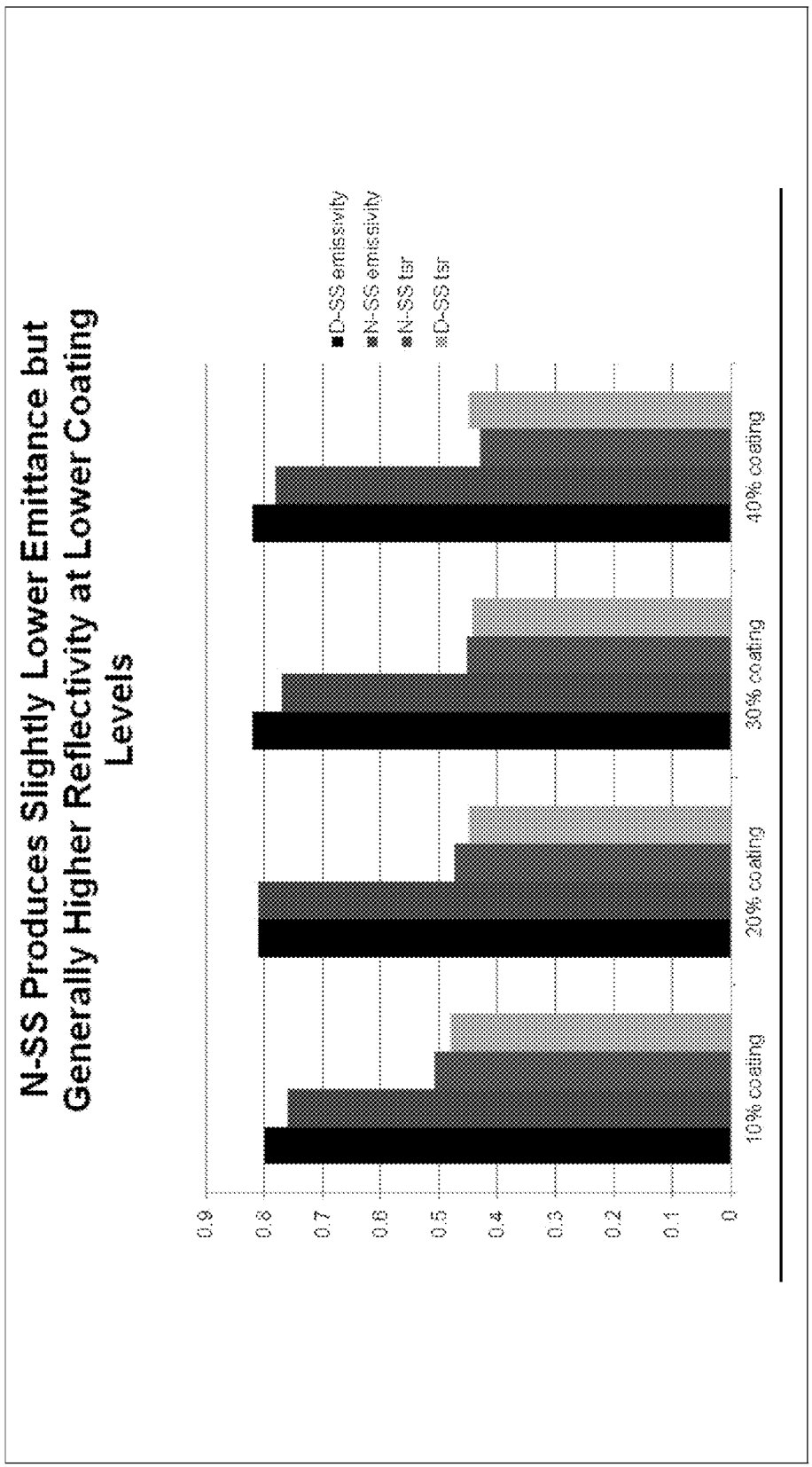
FIG. 11 depicts a bar chart showing the effect of different ratios of soda ash to sand in a sodium silicate first coating layer, according to an embodiment of the disclosed subject matter.

FIG. 11 depicts a bar chart showing the effects that different ratios of soda ash to sand for the first coating can have with varying levels of the second coating dispersed thereon. In this example, the D®-SS (as manufactured by PQ® Corporation of Valley Forge, Pa.) comprises D®-Sodium Silicate $SiO_2/Na_2O$ 2.00 by Weight and has a soda ash to sand ratio of 1.8 by weight. The N®-SS (as manufactured by PQ® Corporation of Valley Forge, Pa.) comprises N®-Sodium Silicate $SiO_2/Na_2O$ 3.22 by Weight and has a soda ash to sand ratio of 1.12 by weight. Soda ash can be used to make sodium oxide and silicon dioxide. Silicon oxide has two functional groups and silicon dioxide has four so these components are crosslinked polymers (water glass) and have no other ingredients therein. However, a broad range of coatings is contemplated herein and the instant disclosure is not limited to these examples. As shown in FIG. 11, the first coating of D®-SS with varying levels of second coating (10 percent w/w, 20 percent w/w, 30 percent w/w, and 40 percent w/w shown) produces slightly higher to even results for emissivity in comparison with the N®-SS first coating. With respect to reflectivity, the N®-SS first coating produces slightly higher results for the 10 percent, 20 percent and 30 percent pigmented second coating, but lower results for the 40 percent pigmented second coating. As such, the soda ash to sand ratio of the first coating can influence properties as the different levels of pigment in the second coating vary.

FIG. 12 depicts a SEM micrograph of a 10 percent w/w pigmented second coating on the 40 percent w/w sodium silicate layer first coating of an aluminum metal flake substrate. As apparent from the micrograph, the pigmented second coating is not continuous on the clear sodium silicate first coating.

As evident from the disclosure herein and the bar charts, graphs, and micrographs of FIGS. 8-12, an equivalent color of an 80 percent w/w pigmented monolayer of a metal aluminum flake substrate can be obtained by embodiments of the disclosed subject matter by using, for example, a 40 percent w/w first coating layer of sodium silicate and a 40 percent w/w second coating layer of pigmented silicate disposed on a metal aluminum flake substrate (i.e., the 40:40 finished flake). The data demonstrates that the 40:40 finished flake also has approximately equal reflectivity (tsr—total solar reflectance) and emissivity to the 80 percent w/w monolayer of a metal aluminum flake substrate. Reducing the amount of pigmented second coating creates opacity in the second coating allowing the effects of the lower first coating silicate layer to unexpectedly influence both the reflectivity (tsr) and emissivity. Without the base silicate first coating layer, the opacity of the second coating can negatively lower the emissivity by influence of the aluminum surface of the substrate. The total solar reflectance is influenced by the structure so the positive reflective qualities of the clear sodium silicate first coating layer can allow reflection of the aluminum substrate via the opacity in the top second coating. Generally, good solar reflectivity (tsr) comes when the coating can be reduced to 30 percent or less and aluminum interaction allowed to take place. If the flake has 30-40 percent or more top coating to 100 percent or more, the tsr will remain the same because it is only a function of the coating. The drive from 30-80 percent in a monolithic coating comes only from the need to obtain parity in emittance, as such, the first layer of the disclosed embodiments creates a platform to elevate both emittance and tsr.

The disclosed subject matter can be utilized for any kind of shingle, such as hip and ridge shingles, strip shingles, three-tab shingles, laminated shingles, or any other type of shingle.

Additional features known in the art likewise can be incorporated, such as disclosed in U.S. Pat. No. 8,197,893 entitled "Colored Metal Flake Surfaced Roofing Materials," the contents of which is incorporated in its entirety by reference herein. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the disclosed subject matter without departing from the spirit or scope of the disclosed subject matter. Thus, it is intended that the disclosed subject matter include modifications and variations that are within the scope of the appended claims and their equivalents.

What is claimed is:

1. A finished flake for a roofing material, comprising:
   a metal flake substrate having an emissivity value up to approximately 0.25 and a reflectivity value up to approximately 0.95;
   a first coating comprising unpigmented sodium silicate disposed on the metal flake substrate, wherein the first coating increases the emissivity value of the substrate and decreases the reflectivity value of the substrate; and
   a second coating comprising sodium silicate loaded with reflective pigments non-uniformly disposed about the first coating of the metal flake substrate, wherein the second coating and at least a portion of the first coating are exposed to an external environment and the finished flake has an emissivity value in excess of approximately 0.75 and a reflectivity value ranging from approximately 0.4 to approximately 0.5.

2. The finished flake according to claim 1, wherein the metal flake substrate comprises at least one of aluminum or aluminum alloy.

3. The finished flake according to claim 1, wherein the metal flake substrate is substantially flat.

4. The finished flake according to claim 1, wherein the first coating of unpigmented sodium silicate comprises at least one of water glass or a prepolymer of silicon dioxide and sodium oxide.

5. The finished flake according to claim 1, wherein the first coating is substantially uniformly disposed on the metal flake substrate.

6. The finished flake according to claim 1, wherein the second coating comprises approximately 30 percent to approximately 45 percent pigment.

7. The finished flake according to claim 1, wherein the first coating further comprises a chemical setting agent disposed thereon or an internal chemical setting agent therein.

8. The finished flake according to claim 7, wherein the chemical setting agent or the internal chemical setting agent comprises at least one of sodium bicarbonate, sodium tetraborate, acidic compounds, carbon dioxide gas, monosodium phosphate, calcium chloride, magnesium sulfate, aluminum sulfate, borax, sodium metaborate, zinc oxide, sodium silico fluoride, and kaolinitic clays and minerals.

9. The finished flake according to claim 7, wherein the chemical setting agent is approximately 1.3 percent of the weight of the metal flake substrate, the first coating of unpigmented sodium silicate is approximately 40 percent of the weight of the metal flake substrate, and the second coating is approximately 10 percent of the weight of the metal flake substrate.

10. The finished flake according to claim 7, wherein the finished flake includes a void structure created by the first coating and chemical setting agent, wherein the void structure comprise an insulator for heat.

11. The finished flake according to claim 9, wherein the second coating is approximately 40 percent of the weight of the metal flake substrate.

12. The finished flake according to claim 1, wherein the first coating is approximately 40 percent of the weight of the metal flake substrate and the second coating is approximately 10 percent of the weight of the metal flake substrate.

13. The finished flake according to claim 1, wherein the first coating and second coating comprise an exterior textured surface.

14. The finished flake according to claim 1, wherein the first coating and the second coating comprise a finished flake coating, wherein the finished flake coating has a thickness dimension ranging from approximately 20 microns to approximately 40 microns.

15. The finished flake according to claim 1, wherein the emissivity value of the metal flake substrate ranges up to approximately 0.05.

16. A roofing material, comprising:
a shingle material; and
a plurality of finished flakes disposed about the shingle material, wherein each finished flake includes
a metal flake substrate having an emissivity value up to approximately 0.25 and a reflectivity value up to approximately 0.95,
a first coating comprising unpigmented sodium silicate disposed on the metal flake substrate, wherein the first coating increases the emissivity value of the substrate and decreases the reflectivity value of the metal flake substrate, and
a second coating comprising sodium silicate loaded with reflective pigments non-uniformly disposed about the first coating of the metal flake, wherein the second coating and at least a portion of the first coating are exposed to an external environment and the finished flake has an emissivity value in excess of approximately 0.75 and a reflectivity value ranging from approximately 0.4 to approximately 0.5.

17. A method of making a finished flake for a roofing material, comprising:
providing a metal flake substrate having an emissivity value up to approximately 0.25 and a reflectivity value up to approximately 0.95;
applying a first coating comprising unpigmented sodium silicate to the metal flake substrate, wherein the first coating increases the emissivity value of the substrate and decreases the reflectivity value of the metal flake substrate;
applying a second coating comprising sodium silicate loaded with reflective pigments non-uniformly about the first coating of the metal flake substrate; and
curing the first coating and the second coating,
wherein the second coating and at least a portion of the first coating are exposed to an external environment and the finished flake has an emissivity value in excess of approximately 0.75 and a reflectivity value ranging from approximately 0.4 to approximately 0.5.

18. The method of making the finished flake according to claim 17, wherein applying the first coating on the metal flake substrate comprises spraying the first coating on the metal flake substrate.

19. The method of making the finished flake according to claim 17, wherein applying the second coating on the substrate comprises spraying the second coating on the first coating.

20. The method of making the finished flake according to claim 17, further comprising providing a fluidized bed coater, wherein the fluidized bed coater applies the first coating on the substrate and applies the second coating on the first coating having the chemical setting agent.

21. The method of making the finished flake according to claim 17, further comprising applying a chemical setting agent to at least one of the first coating and the second coating.

* * * * *